(12) United States Patent
Hikmet et al.

(10) Patent No.: US 9,448,111 B2
(45) Date of Patent: Sep. 20, 2016

(54) SPECTRAL DETECTION DEVICE FOR DETECTING SPECTRAL COMPONENTS OF RECEIVED LIGHT

(75) Inventors: Rifat Ata Mustafa Hikmet, Eindhoven (NL); Ties Van Bommel, Horst (NL); Eduard Johannes Meijer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 375 days.

(21) Appl. No.: 13/500,667

(22) PCT Filed: Oct. 11, 2010

(86) PCT No.: PCT/IB2010/054580
§ 371 (c)(1),
(2), (4) Date: Apr. 6, 2012

(87) PCT Pub. No.: WO2011/045722
PCT Pub. Date: Apr. 21, 2011

(65) Prior Publication Data
US 2012/0187849 A1 Jul. 26, 2012

(30) Foreign Application Priority Data

Oct. 16, 2009 (EP) .................................... 09173234

(51) Int. Cl.
*H05B 37/02* (2006.01)
*G01J 3/32* (2006.01)
(Continued)

(52) U.S. Cl.
CPC .................. *G01J 3/32* (2013.01); *F21K 9/137* (2013.01); *G01J 1/06* (2013.01); *G01J 1/32* (2013.01); *G01J 3/02* (2013.01); *G01J 3/0205* (2013.01);
(Continued)

(58) Field of Classification Search
USPC .......... 315/149–159; 356/416, 402, 421, 422
See application file for complete search history.

(56) References Cited

U.S. PATENT DOCUMENTS 6,040,944 A * 3/2000 Pan ...................... G02B 3/0087
359/211.5
6,384,458 B1 * 5/2002 Bode et al. ................... 257/431
(Continued)

FOREIGN PATENT DOCUMENTS

JP 2002277328 A 9/2002
JP 2003185942 A 7/2003
(Continued)

OTHER PUBLICATIONS

W. Nakagawa et al., "Wide-field-ofview Narrow-ban Spectral Filters based on Photonic Crystal Nanocavities", Feb. 1, 2002, Optics Letters, vol. 27, No. 3.*
(Continued)

*Primary Examiner* — Douglas W Owens
*Assistant Examiner* — James H Cho

(57) ABSTRACT

The present invention relates to a spectral detection device (100) for detecting spectral components of received light, wherein the spectral detection device (100) comprises a filtering structure (110) arranged to filter the received light and output light with a wavelength within a predetermined wavelength range; and a light sensor (120) arranged to detect the light output by the filtering structure (110), wherein the filtering structure (110) is variable to allow a variation of the predetermined wavelength range over time. The arrangement enables a compact spectral detection device that may be provided at a low cost.

14 Claims, 9 Drawing Sheets

(51) Int. Cl.

| | | |
|---|---|---|
| *G01J 1/06* | (2006.01) | |
| *G01J 1/32* | (2006.01) | |
| *G01J 3/02* | (2006.01) | |
| *G01J 3/36* | (2006.01) | |
| *G01J 3/51* | (2006.01) | |
| *G02B 1/00* | (2006.01) | |
| *G02B 5/20* | (2006.01) | |
| *G02B 19/00* | (2006.01) | |
| *F21K 99/00* | (2016.01) | |
| *F21V 23/04* | (2006.01) | |
| *F21Y 101/02* | (2006.01) | |
| *G01J 1/02* | (2006.01) | |
| *G01J 1/04* | (2006.01) | |
| *G01J 3/12* | (2006.01) | |
| *F21Y 113/00* | (2016.01) | |

(52) U.S. Cl.
CPC ............... *G01J 3/0289* (2013.01); *G01J 3/36* (2013.01); *G01J 3/51* (2013.01); *G01J 3/513* (2013.01); *G02B 1/005* (2013.01); *G02B 5/20* (2013.01); *G02B 19/0028* (2013.01); *G02B 19/0066* (2013.01); *G02B 19/0085* (2013.01); *F21V 23/0442* (2013.01); *F21Y 2101/02* (2013.01); *F21Y 2113/005* (2013.01); *G01J 1/0266* (2013.01); *G01J 1/0488* (2013.01); *G01J 2003/1213* (2013.01)

(56) References Cited

U.S. PATENT DOCUMENTS

| | | | | |
|---|---|---|---|---|
| 6,700,690 | B1* | 3/2004 | Buchsbaum | G02B 5/20 359/230 |
| 7,145,124 | B2* | 12/2006 | Garrood et al. | 250/208.1 |
| 7,773,172 | B2* | 8/2010 | Svec | H04N 5/2254 349/62 |
| 2006/0018118 | A1 | 1/2006 | Lee et al. | |
| 2006/0033087 | A1 | 2/2006 | Foulger et al. | |
| 2006/0054780 | A1* | 3/2006 | Garrood | B82Y 20/00 250/208.1 |
| 2006/0077325 | A1 | 4/2006 | Li et al. | |
| 2006/0170907 | A1 | 8/2006 | Tuschel | |
| 2006/0203240 | A1* | 9/2006 | Ingleson | G01J 3/02 356/319 |
| 2007/0273265 | A1 | 11/2007 | Hikmet | |
| 2009/0034051 | A1 | 2/2009 | Arsenault et al. | |
| 2009/0202236 | A1* | 8/2009 | Hama et al. | 396/180 |
| 2010/0141152 | A1* | 6/2010 | Meijer et al. | 315/149 |

FOREIGN PATENT DOCUMENTS

| | | | |
|---|---|---|---|
| JP | 20090034051 | A | 2/2009 |
| JP | 2009053905 | A | 3/2009 |
| WO | 9723580 | A1 | 7/1997 |
| WO | 9820388 | | 5/1998 |
| WO | 9963400 | A1 | 12/1999 |
| WO | 2006067482 | A2 | 6/2006 |
| WO | WO 2007000699 | A1 * | 1/2007 |
| WO | 2008012715 | A2 | 1/2008 |

OTHER PUBLICATIONS

E. Bucher et al., "Characterization of an Acousto-optic Tunable Filter and Use in Visible Spectrophotometry", 1999, Applied Spectroscopy, vol. 53, No. 5.*

G.A. Ozin et al; "P-Ink and Elast-ink From Lab to Market", Materials Today, vol. 11, Issues7-8, pp. 44-51, 2008.

* cited by examiner

SPECTRAL DETECTION DEVICE FOR DETECTING SPECTRAL COMPONENTS OF RECEIVED LIGHT

FIELD OF THE INVENTION

The present invention relates to a spectral detection device for detecting spectral components of received light.

BACKGROUND OF THE INVENTION

Today spectral detection devices, such as spectrometers, are increasingly used in light management applications, for example, to measure the color point and color rendering index of light to determine the atmosphere created by a number of luminaries, and/or to monitor light emitted by a specific luminary.

A typical example of a light management application using a spectrometer is an ambient intelligent lighting system that allows a user to flexibly determine the atmosphere created by a number of luminaries in a room. To achieve the desired atmosphere the ambient intelligent system measures and controls the lighting characteristics of each individual luminary by a control feedback system that measures the intensity, color point and color rendering index of the individual luminaries.

Furthermore, a spectrometer may also be used to monitor light color in modern luminaries, in which white light is generated by light emitting diodes (LEDs), for example with a red, green and blue (RGB) LED (or more and/or different colors of LEDs). Here, monitoring of the light color is important since the mixed light from the LEDs only results in white light if the light from each individual LED is properly combined with the light coming from the other LEDs.

WO2008/012715 discloses an integrated image recognition and spectral detection device comprising an image sensor array for recognizing images and motion, and a Fabry-Perot resonator structure for detecting spectral components of received light which covers at least a part of the light-sensitive surface of the image sensor array. To be able to measure multiple spectral components of the received light, the Fabry-Perot resonator structure is segmented into a chessboard-like structure, where each segment has a different thickness to provide a different spectral component. Further, the arrangement is such that each spectral component is detected by a different sensor in the image sensor array. In operation, the image sensor array continuously detects the spectral components contained in the incident light and transmits corresponding signals to a control means. The control may then adjust the electric current for the LEDs separately based on the detected spectral components and a color setting control algorithm, in order to achieve a desired color point.

However, even though the spectral detection device disclosed in WO2008/012715 may satisfactorily measure the spectral components of received light, it is costly to deposit an array of multilayered interference filters close together. Therefore it may be desirable to provide a low cost alternative spectral detection device that does not require many (expensive) deposition and lithography steps. There is also a desire to have a more compact device compared to the prior art. In WO2008/012715 many filters are used with narrow spectral bands in order to measure spectral components. To achieve a device that is sensitive enough to detect light levels on the order of 100 lux, the pixel areas cannot be reduced to a very small area, limiting the size reduction options for the device. Thus, there seem to be a need for an alternative spectral detection device.

SUMMARY OF THE INVENTION

It is an object of the present invention to provide an alternative spectral detection device for detecting spectral components of received light.

According to an aspect of the invention there is provided a spectral detection device for detecting spectral components of received light, wherein the spectral detection device comprises a filtering structure arranged to filter the received light and output light with a wavelength within a predetermined wavelength range; and a light sensor arranged to detect the light output by the filtering structure, wherein the filtering structure is variable to allow a variation of the predetermined wavelength range over time.

The present invention is based on the understanding that by varying the wavelengths of the light output by the spectral detection device over time, different spectral components of received light can be detected at a single location (one at the time). The inventive spectral detection device is advantageous in that it does not require different spectral components to be detected (in parallel) at different locations, thereby enabling a more compact spectral detection device. Furthermore, since the same light sensor can be used to detect different spectral components (sequentially), the number of light sensors used by the spectral detection device may be reduced, thereby reducing costs. In addition the present invention further reduces cost in relation to the prior art, because it does not require the costly deposition of an array of multilayered interference filters close together.

The predetermined wavelength range may be adjusted by applying an external stimulus to the filtering structure, wherein the external stimulus is selected from the group of an electric field, temperature or a mechanical force. This enables easy and reliable control of the wavelengths that are output by the filtering structure.

The predetermined wavelength range may typically be selected for calculating the spectrum of light and or predicting the color point and/or the color temperature of a light source. Thus, the predetermined wavelength range may have a width between 20 nm up to 200 nm, or more preferably have a width in a range from 20 nm up to 50 nm to obtain high resolution. For example, the predetermined wavelength range may be 450-495 nm to detect blue light (i.e. a width of 45 nm), 495-570 nm to detect green light (i.e. a width of 75 nm), or 620-750 nm to detect red light (i.e. a width of 130 nm).

The filtering structure may be adapted to transmit light with a wavelength that lies within the predetermined wavelength range (while blocking light with a wavelength outside the predetermined wavelength range). As a transmissive filtering structure may simply be placed on top of the light sensor, it may be easily mounted in the spectral detection device and enables a compact arrangement.

According to an alternative embodiment, the filtering structure may be adapted to reflect light with a wavelength that lies within the predetermined wavelength range (while transmitting light with a wavelength outside the predetermined wavelength range). An advantage is that a reflective filtering structure in principle may be implemented using a single switchable photonic band gap filter.

According to an embodiment, the filtering structure may comprise a switchable photonic band gap filter. The use of a switchable photonic band gap filter is advantageous in that it enables easy and reliable variation of the wavelengths that are output by the filtering structure.

The spectral detection device may further comprise an angle selection element arranged to restrict the angle of incidence for the light received by the filtering structure to a predetermined angle of incidence. The angle of incidence may typically have an associated angular acceptance range such that light is accepted from directions in the range from $\theta-\alpha$ to $\theta+\alpha$, where $\theta$ is the angle of incidence. Further, $\alpha$ may preferably be less than 5° more preferably less than 2° and most preferably less than 1°. This allows the spectral properties of light to be measured for a specific angle of incidence. In this way it may be possible to locate light coming from a specific light source and interactively adjust its properties.

According to an embodiment, the angle selection element may be variable to allow a variation of the angle of incidence. This allows the spectral properties of light to be measured as a function of angle of incidence. It is also possible to sequentially locate light coming from different light sources.

According to another embodiment, the angle selection element may comprise a plurality of regions, wherein each region is adapted to accept light with a different angle of incidence. In this way one can measure spectral properties of light from different directions without needing to move the angle selection element.

The spectral detection device may further comprise a diffuser. The diffuser may be arranged to randomly redirect the light received by the spectral detection device. A filtering structure, such as a switchable photonic band gap filter, may have an angular dependence, i.e. light hitting the filtering structure at different angles results in a different spectral response of the filtering structure. This can be overcome by arranging a diffuser such that light passes the diffuser before reaching the angle selection element. Through the arrangement, a fraction of the diffused light is transmitted through the angle selection means and hits the filtering structure at a specific angle. In this way there is no different spectral response as a result of angular dependence of the filter, i.e. the filtering structure becomes angle independent.

Furthermore, the spectral detection device according to the present invention may advantageously be included in an illumination device, further comprising a plurality of light emitting devices of different colors; a control unit adapted to process a plurality of spectral components acquired from the spectral detection device, wherein the control unit is further adapted to control the plurality of light emitting devices based on the detected spectral components to achieve a predetermined lighting effect, such as a specific color point and/or color temperature.

Moreover, the spectral detection device according to the present invention may advantageously be included in an illumination control system for controlling a plurality of luminaries (or light sources), wherein the system further comprises a control unit adapted to process a plurality of spectral components acquired from the spectral detection device, wherein the control unit is further adapted to control the plurality of luminaries (or light sources) based on the detected spectral components to achieve a predetermined lighting effect, such as a specific color point and/or color temperature.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
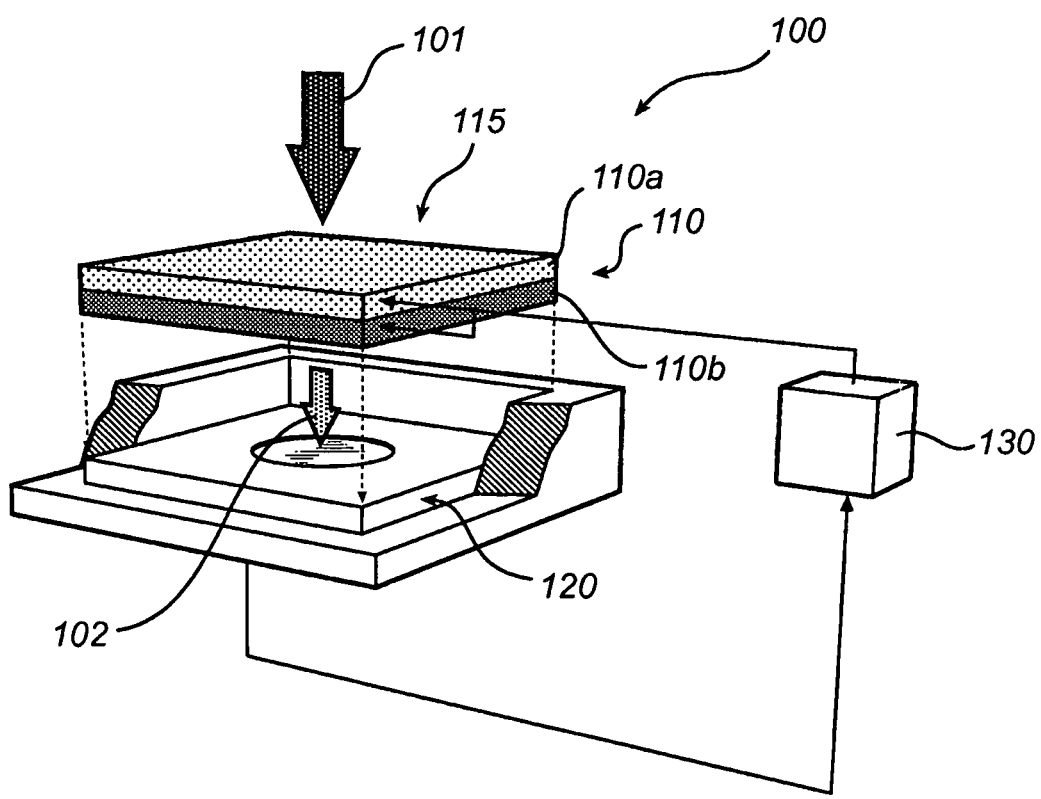
FIG. 1 schematically illustrates a spectral detection device according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a spectral detection device 100 according to an embodiment of the invention. The spectral detection device 100 comprises a light sensor 120 and a filtering structure 110 arranged between the light sensor 120 and a light inlet 115 of the spectral detection device. Here this is achieved by arranging the filtering structure 110 on top of the light sensor 120. The light sensor (or a photo sensor) may for example be a photo diode, photo resistor, photovoltaic cell, photomultiplier, avalanche photodiode, or charge couple device. The filtering structure 110 is adapted to filter light 101 received by the spectral detection device and output light 102 with a wavelength that lies within a predetermined wave length range. The light 102 output by the filtering structure can then be detected by the light sensor 120. A control unit 130, such as a microprocessor, may be connected to the filtering structure 110 for controlling the predetermined wave length range of the light output by the filtering structure. The control unit 130 may be included in the spectral detection device 100 or be an external device.

The filtering structure 110 is here a transmission filter adapted to transmit light with a wavelength that lies within the predetermined wave length range. The transmission filter can be made from two switchable photonic band gap filters 110a,b placed on top of each other. An example of a switchable photonic band gap filter is hybrid material of a metallopolymer gel and a colloidal photonic crystal. A more detailed description of such a material can be found in Ozin, G. A., Asrenault, A. C., 2008, "P-Ink and Elast-ink From Lab to Market", *Materials Today*, Volume 11, Issues 7-8, Pages 44-51, which is hereby incorporated by reference.

Each of the switchable photonic band gap filters 110a,b has a reflection band, i.e. a range of wavelength for which light is reflected. The position of the reflection band can be changed by applying an external stimuli, such as an electrical field, to the switchable photonic band gap filter. This can be achieved by applying a voltage to the switchable photonic band gap filter. Alternatively, the position of the photonic band gap filter can be a changed by heating the filter (e.g. by employing dielectric heating or resistive heating of the photonic band gap filter) or by a mechanical force (e.g. by applying a pressure to the photonic band gap filter).

Figure 2A:
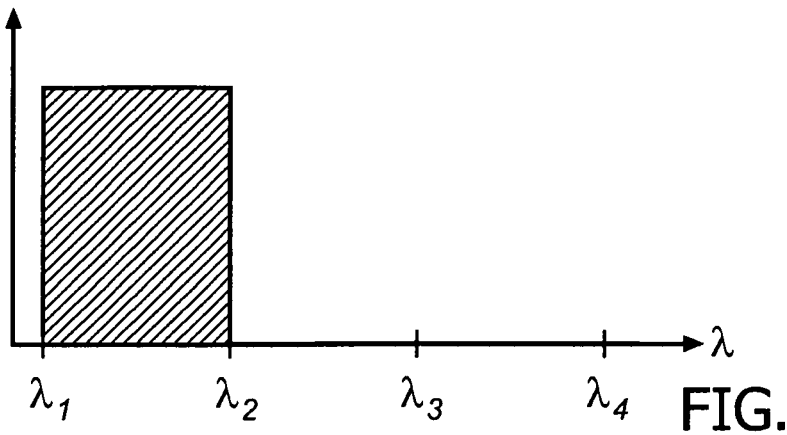
FIGS. 2a-c schematically illustrates how a transmissive filtering structure can be achieved by stacking two photonic band gap filters on top of each other.
Figure 2B:
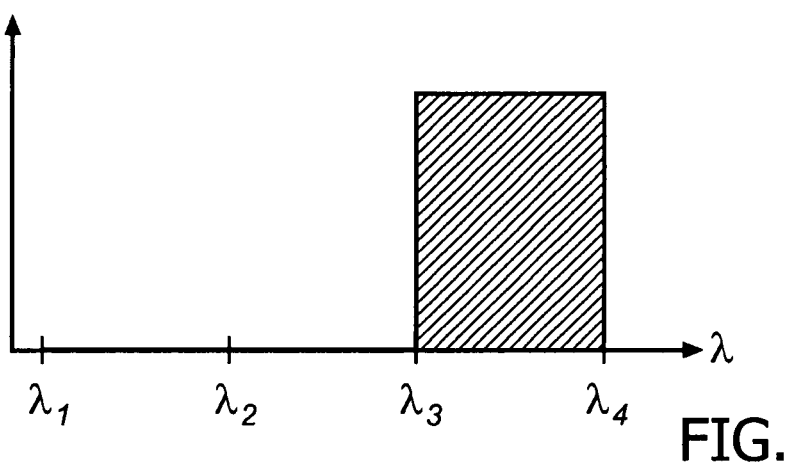
Figure 2C:
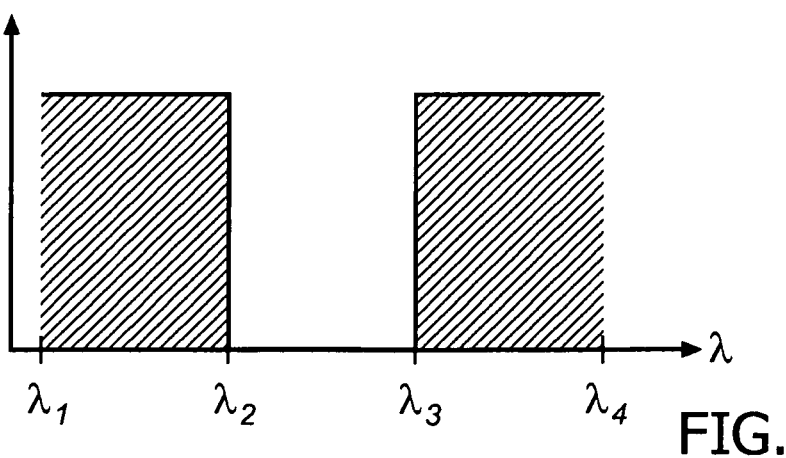

The principle of the filtering structure 110 is schematically illustrated in FIGS. 2a-c. Here, the first switchable photonic band gap filter 110a reflects light with a wavelength in a range $\lambda_1$ to $\lambda_2$ (e.g. 380-495 nm corresponding to violet indigo and blue) as illustrated in FIG. 2a, whereas light with wavelengths outside this range is transmitted. Similarly, the second switchable photonic band gap filter 110b reflects light with a wavelength in the range $\lambda_3$ to $\lambda_4$ (e.g. 570-750 nm corresponding to, yellow, orange and red) as illustrated in FIG. 2b, whereas light with wavelengths outside this range is transmitted Thus, the filtering structure 110 transmits light with a wavelength in the range $\lambda_2$ to $\lambda_3$ (e.g. 495-570 nm corresponding to green light) as illustrated in FIG. 2c, whereas light with wavelengths outside this range is blocked. It can be noted that it is here assumed that (although not shown) there are also filters which block light with a wavelength shorter than $\lambda_1$ and longer than $\lambda_4$. By changing the reflection band of the switchable photonic band gap filters 110a,b, the wavelength range of the transmission band of the filtering structure 110 can be gradually shifted across the visible spectrum such that various colors are output by filtering structure.

Figure 3:
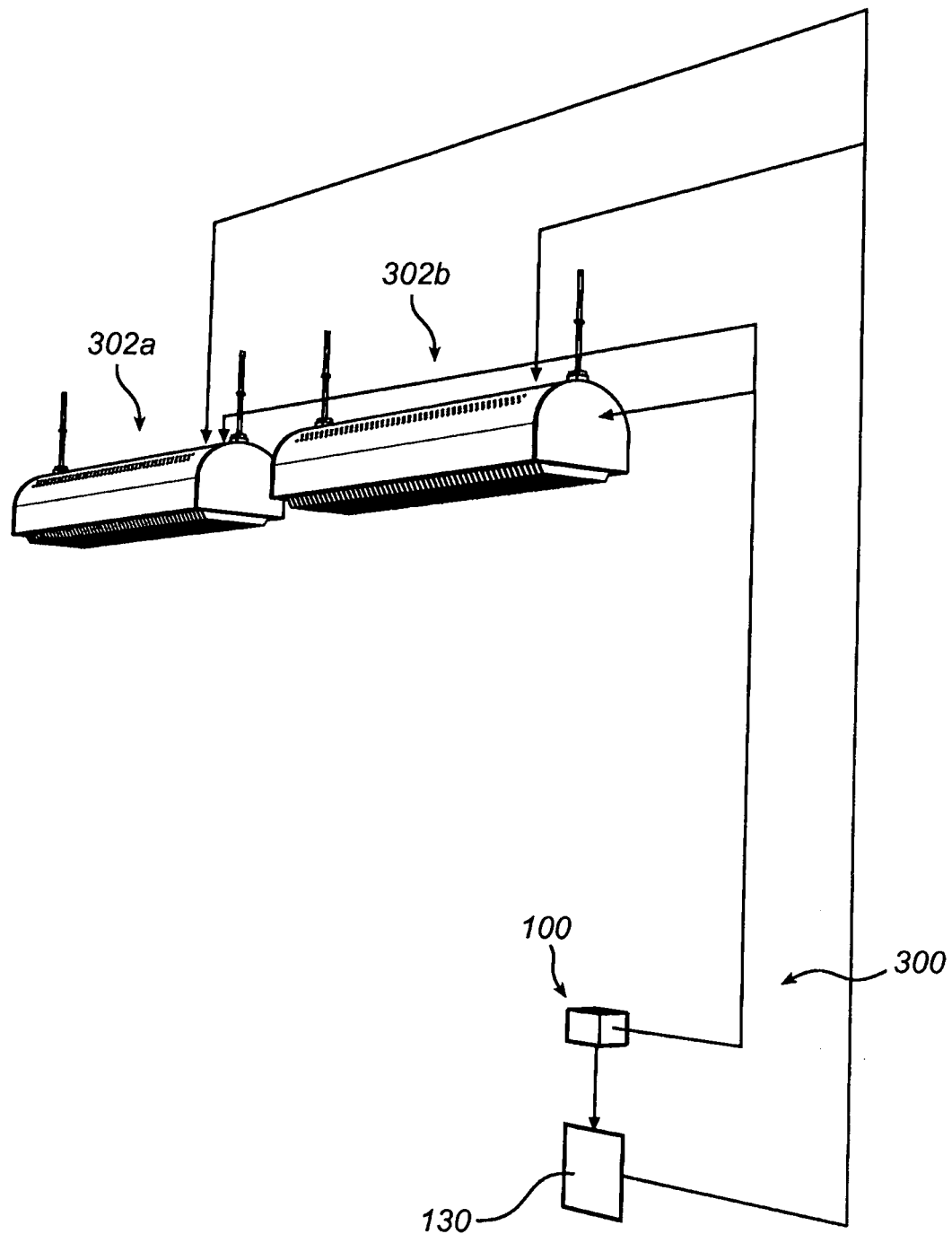
FIG. 3 schematically illustrates an illumination control system including a spectral detection device.

FIG. 3 schematically illustrates an embodiment where the spectral detection device 100 is included in an illumination control system 300 arranged to control a plurality of luminaries 302a-b. A control unit 130 included in the illumination control system is connected to the spectral detection device 100 to control the predetermined wavelength range of the light output by the filtering structure 110. The control unit 130 is also connected to the light sensor in the spectral detection device to acquire measurement signals from the light sensor and to the luminaries 302a,b for control of the light output by the luminaries.

Figure 4:
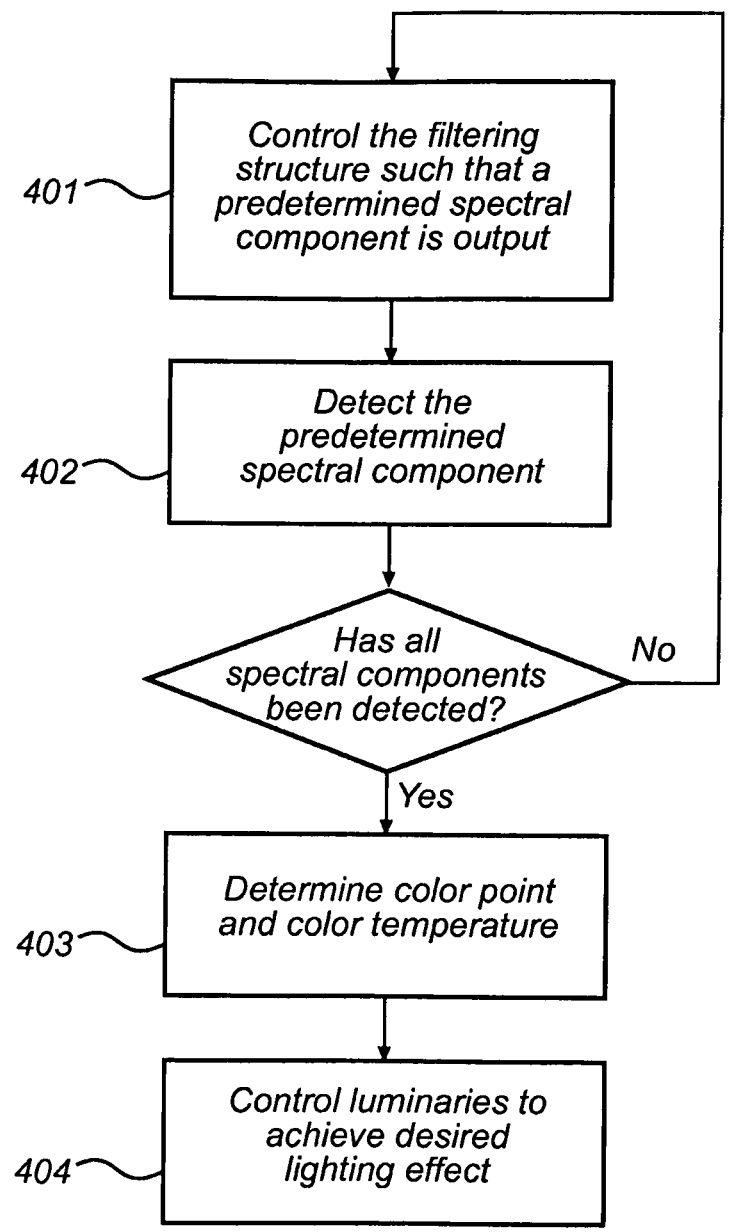
FIG. 4 schematically illustrates a flow chart for determining a spectral composition of received light.

In operation, the spectral detection device 100 receives light from the luminaries 302a-b. The spectral composition of the received light can then be determined by sequentially detecting different spectral components of the received light as schematically illustrated by the flow chart in FIG. 4.

In step 401, the control unit 130 controls the switchable photonic band gap filters 110a-b such that a first spectral component of the received light is output by the filtering structure 110. The first spectral component may, for example, be light having a wavelength corresponding to blue light (i.e. 450 to 495 nm). The first spectral component of the received light is detected by the light sensor in step 402, and a measurement signal is transmitted to the control unit 130. Steps 401 and 402 are then repeated until all relevant spectral components have been detected. For example, the procedure may be repeated to detect green and red light. Based on the detected spectral components, the control unit 130 may then determine the color point and color temperature of received light according to techniques well-known in the field in step 403, and adjust the illumination by the luminaries 402a-b to achieve a desired lighting effect in step 404.

Figure 5A:
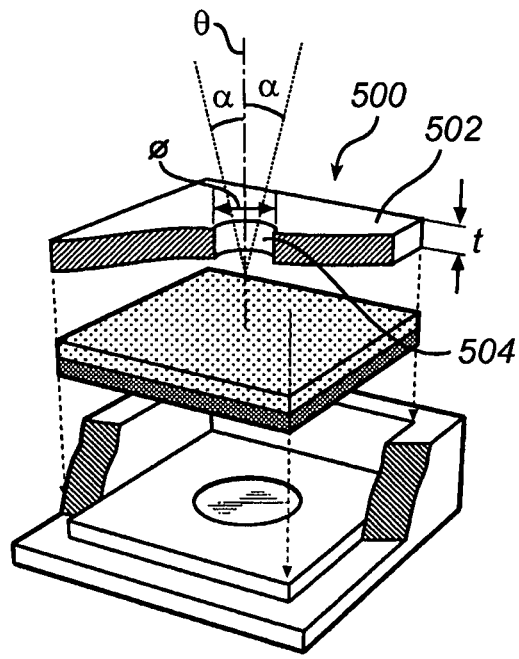
FIGS. 5a-e schematically illustrates various embodiments of an angle selection element.

FIG. 5a schematically illustrates an embodiment where the spectral detection device further comprises an angle selection element 500 arranged to restrict an angle of incidence for the light received by the filtering structure 110 to a predetermined angle of incidence θ. The angle selection element 500 is here a light absorbing plate 502 (such as anodized aluminium absorbing white light) with a cylindrical hole 504 having an axis arranged in a direction θ. The angle selection element 500 accepts light from directions in the range θ−α to θ+α. That is the angular acceptance range is 2α, where the aspect ratio of the diameter Ø of the hole to the plate thickness t determines the angular range 2α, i.e. α=arctan(Ø/2t). Preferably α is less than 5° more preferably less than 2° and most preferably less than 1°. In this embodiment use of a single hole is illustrated. However for small acceptance angles this might mean that the hole must be in a thick plate. In order to avoid using thick plates it is possible to use a plurality of holes with smaller diameters drilled in a much thinner plate.

Furthermore, in order to select light coming from different angles, the plate 502 (or the whole spectral detection device) may be rotated. For example the plate can be placed on a mount which can rotate about two different axes enabling the adjustment of angle in all azimuth angles in this way enabling the selection of light from different directions. By measuring light with a specific angle of incidence light from a specific light source can be detected.

Figure 5B:
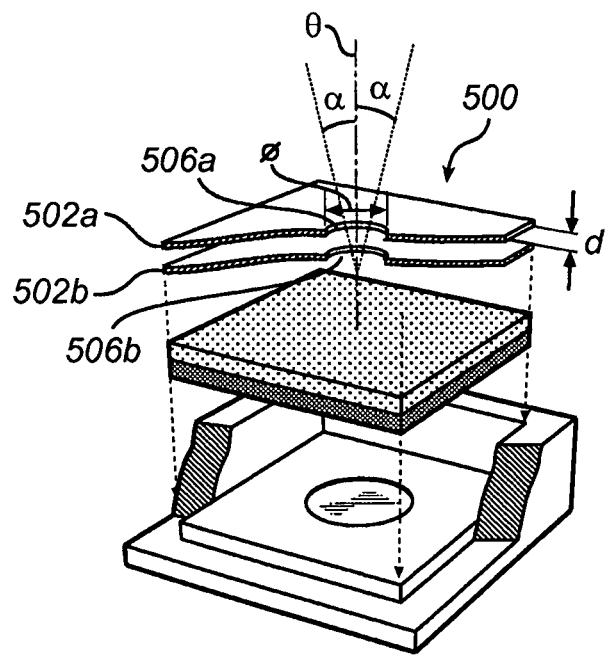

FIG. 5b schematically illustrates an alternative embodiment of a variable angle selection element. Here the angle selection element 500 comprises two thin plates 502a-b, wherein each of the plates is provided with a hole 506a,b. The plates are separated by a distance d. By moving the plates with respect to each other (in their plane) the angle of incidence may be changed. For example, in the illustrated example the upper plate 502a may be moved to the left, and lower plate 502b may be moved to the right to tilt the angle of incidence anti-clockwise. Furthermore, the angular range 2α can be changed by changing the distance d between the plates.

Figure 5C:
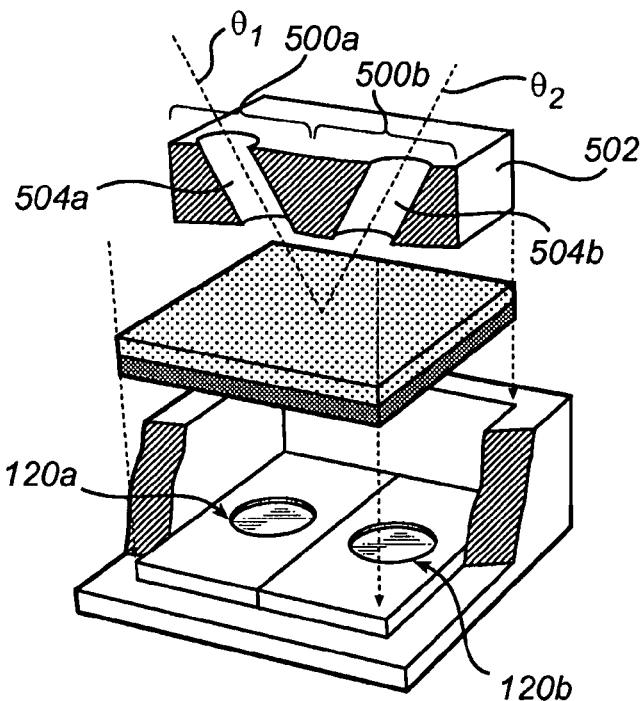

Further, as illustrated in FIG. 5c, the angle selection element may be segmented into two (or more) regions 500a-b to simultaneously accept light with different angle of incidences $\theta_1$, $\theta_2$. This enables light to be simultaneously detected from more than one direction. This can be achieved by a light absorbing plate 502, where each region 500a,b is provided with a cylindrical hole 504a,b having an axis in a direction $\theta_1$, $\theta_2$. By having a light sensor 120a,b associated with each hole 504a,b it is possible to separately detect the light for the various directions $\theta_1$, $\theta_2$.

Figure 5D:
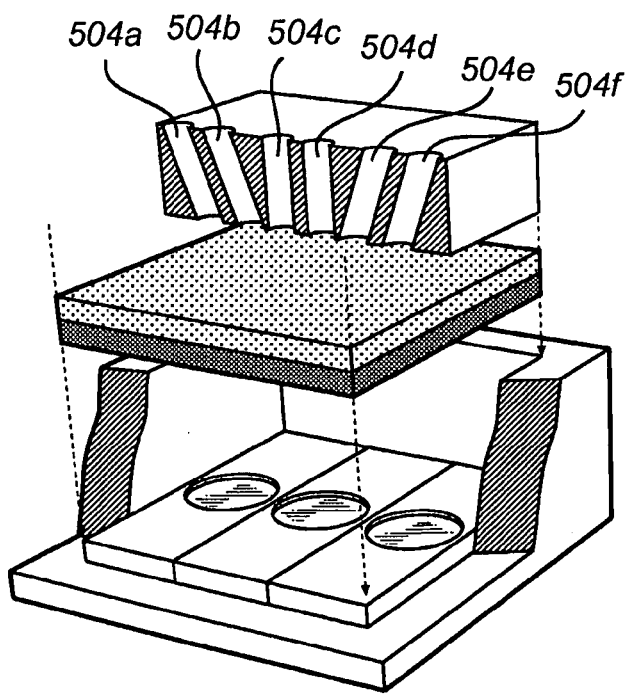

Furthermore, as exemplified by the embodiment illustrated in FIG. 5d, the angle selection element may comprise multiple cylindrical holes arranged in the same direction (i.e. the axes of the cylindrical holes are parallel) in order to increase the amount of light received by the light sensor from that direction (as compared with a thicker plate with a larger hole so that the aspect ratio of the diameter to the thickness is preserved). Here, a first pair of holes 504a-b transmits light from a first direction, a second pair of holes 504c-d transmits light from a second direction, and a third pair of holes 504e-f transmits light from a third direction. It is also possible to include more light sensors corresponding to each cylindrical hole, thereby improving the reliability of the spectral detection device.

Figure 5E:
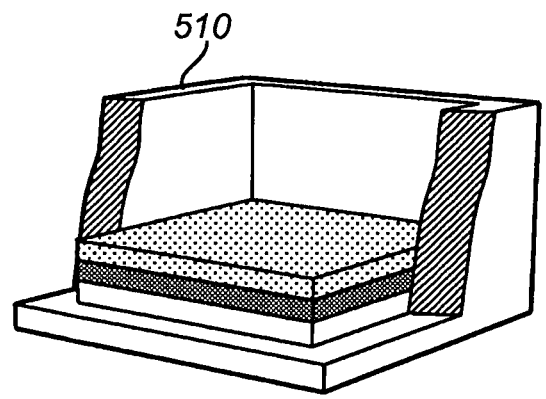

FIG. 5e schematically illustrates yet another embodiment for measuring light from one specific direction. Here the angle selection element is a tube-shaped structure 510 arranged around the filtering structure.

Figure 6:
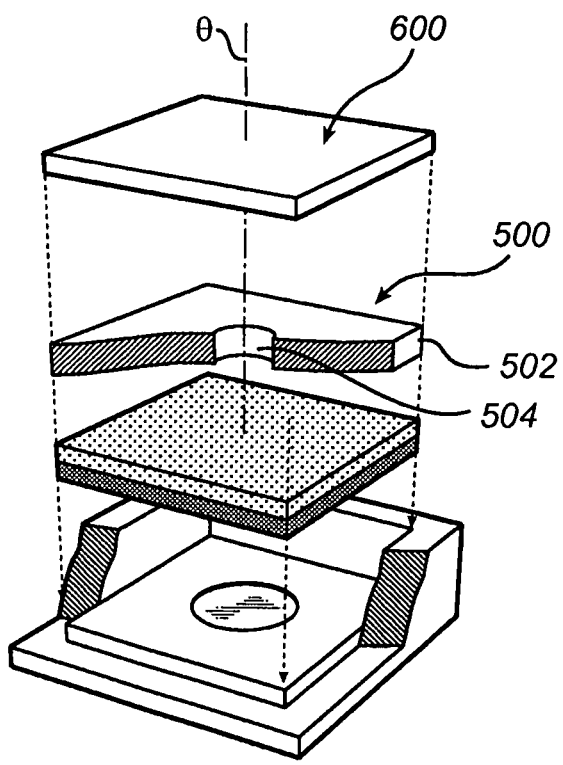
FIG. 6 schematically illustrates an embodiment of a spectral detection device comprising a diffuser.

FIG. 6 schematically illustrates an embodiment where the spectral detection device 100 further comprises a diffuser 600 arranged on top of the angle selection element 500 such that light received by the spectral detection device passes the diffuser 600 before it reaches the angle selection element. The diffuser 600 randomly redirects the light received by the spectral detection device from all directions. A fraction of the diffused light is then transmitted through the angle selection element 500 and hits the filtering structure 110 at a specific angle θ. In this way light coming from different angles can be averaged making the device angle independent.

Figure 7:
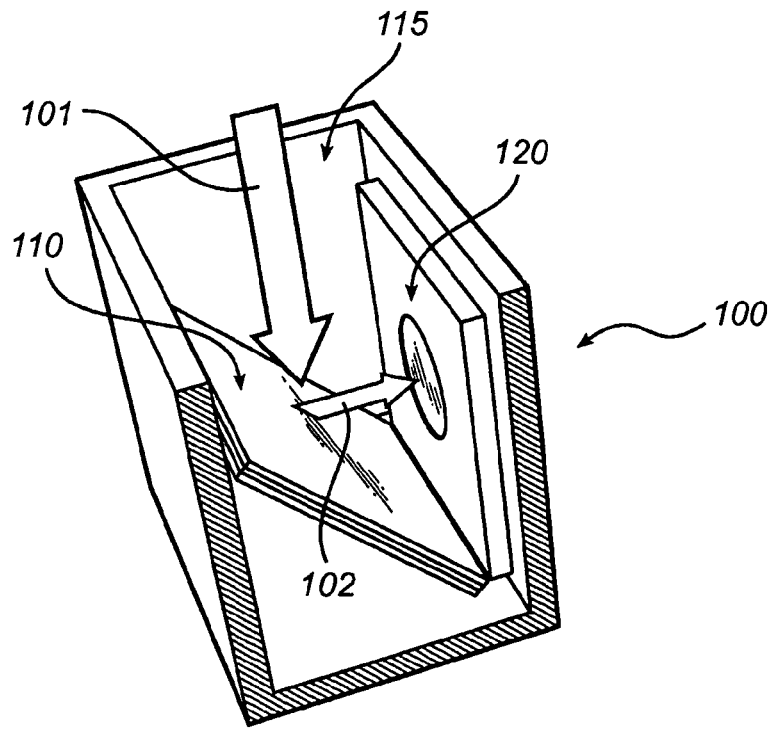
FIG. 7 schematically illustrates an embodiment of a spectral detection device with a reflective filtering structure.
Figure 8:
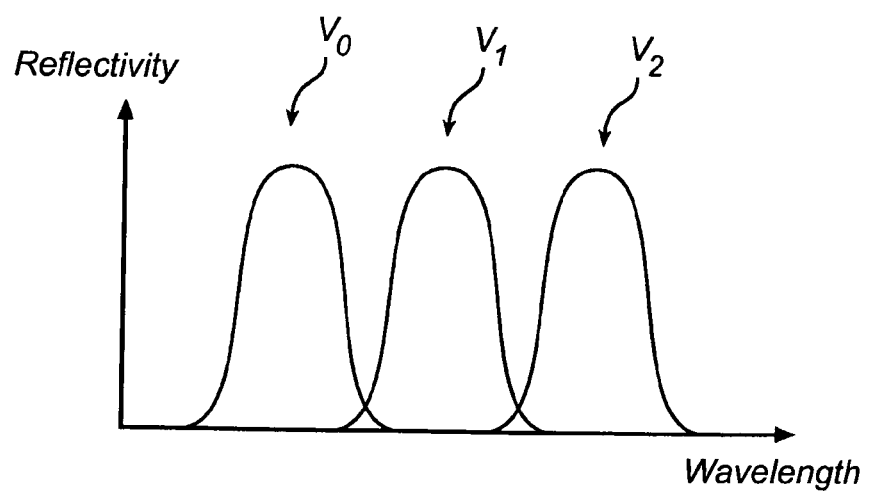
FIG. 8 schematically illustrates how a reflection band of a switchable photonic band gap filter can be shifted by applying a voltage.

FIG. 7 schematically illustrates an alternative embodiment where the filtering structure 110 is a reflection filter adapted to reflect light with a wavelength that lies within a predetermined wave length range. The filtering structure 110 is here achieved by a single switchable photonic band gap filter, wherein the predetermined wave length range coincides with the reflection band of the switchable photonic band gap filter. As illustrated in FIG. 7, the switchable photonic band gap filter 110 is arranged such that the reflected 102 component of incident light 101 is directed towards the light sensor 120. Thus, as light 101 is received by the spectral detection device 100, the light within the predetermined wavelength range is reflected towards the light sensor 120, whereas light with a wavelength outside the predetermined wavelength is transmitted through the switchable photonic band gap filter 110. Further, the predetermined wavelength range, and thus the wavelengths of the light 102 output by the filtering structure 110, can be adjusted by changing the position of the reflection band of the reflection filter by applying an external stimulus, such as a voltage, to the switchable photonic band gap filter. For example, as illustrated in FIG. 8, the switchable photonic band gap filter may reflect blue light when no voltage or a low voltage $V_0$ (e.g. 0V) is applied to the switchable photonic band gap filter, green light when the voltage is increased to $V_1$ (e.g. 1V), and red light when the voltage is further increased to $V_2$ (e.g. 2V).

Figure 9:
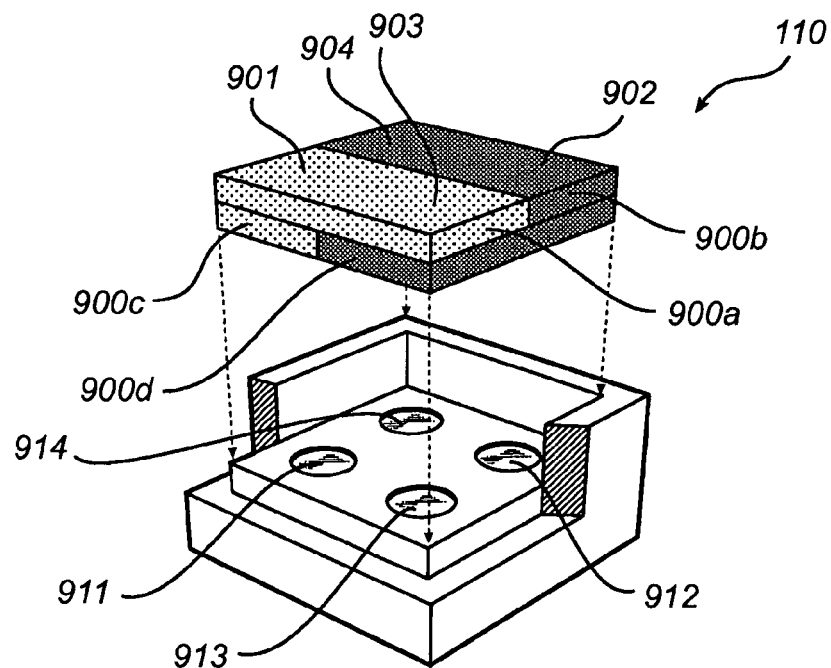
FIG. 9 schematically illustrates a pixelated spectral detection device.

FIG. 9a schematically illustrates an embodiment of a spectral detection device with a pixelated filtering structure 110. The pixelated filtering structure comprises first 900a and second 900b switchable photonic band gap filters arranged in a first layer. Furthermore, third 900c and fourth 900d switchable photonic band gap filters are arranged in a second layer, wherein the first layer is stacked on the second layer.

Through the arrangement, the pixelated filtering structure is segmented into four regions 901-904, wherein light falling onto the first region 901 passes the first switchable photonic band gap filter 900a and then the third switchable photonic band gap filter 900c; light falling onto the second region 902 passes the second switchable photonic band gap filter 900b and then the fourth switchable photonic band gap filter 900d; light falling onto the third region 903 passes the first switchable photonic band gap filter 900a and then the fourth switchable photonic band gap filter 900d; and light falling onto the fourth region 904 passes the second switchable photonic band gap filter 900b and then the third switchable photonic band gap filter 900c.

By changing the reflection bands of the switchable photonic band gap layers, the predetermined wavelength ranges for the first 901, second 902, third 903, and fourth 904 regions can be adjusted. By arranging a light sensor 911-914 beneath each region 901-904, the spectral detection device may detect multiple spectral components in parallel. Furthermore, as is recognized by a person skilled in the art, other types of pixelated filtering structures may also be achieved. For example, the pixelated filtering structure may comprise more regions by combining more switchable photonic gap filters. Since each region may be designed to cover a smaller wavelength spectrum (compared to a non-pixelated device) an enhanced accuracy and increased speed may be achieved.

Figure 10:
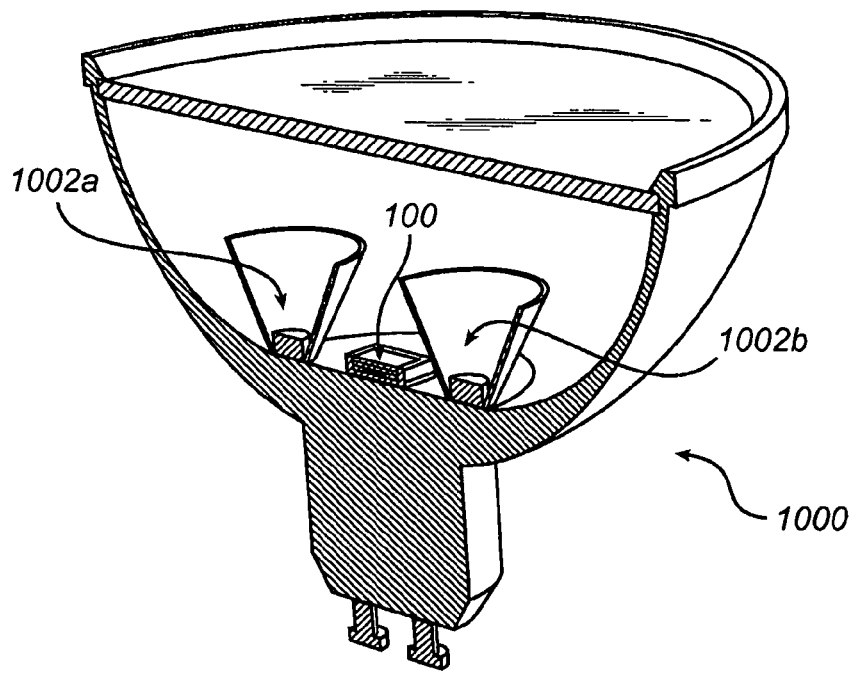
FIG. 10 schematically illustrates a spectral detection device included in an illumination device.

FIG. 10 schematically illustrates an embodiment where the spectral detection device 100 is included in an illumination device 1000, such as a retrofit LED lamp. The illumination device 1000 further comprises a plurality of light emitting devices 1002a-b, such as light emitting diodes (LEDs) in different colors, and a control unit (not shown). The control unit is connected to the spectral detection device 100 to control the predetermined wavelength range of the light output by the filtering structure. The control unit is also connected to the light sensor in the spectral detection device to acquire measurement signals from the light sensor and to the light emitting devices 1002a-b for control of the light output by the illumination device. In operation, the spectral detection device may receive light from the LEDs 1002a-b and/or from the ambient environment and detect the spectral component of the received light by a procedure similar to the one described in relation to FIG. 4. The control unit 130 can then determine the color point and color temperature of received light, and adjust the LED current to the LEDs 402a-b to achieve a desired lighting effect.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. For example, a transmissive filtering structure may comprise more than two switchable photonic band gap layers. It is also possible to combine a switchable photonic band gap layer with a non-switchable reflector to obtain a transmissive filtering structure. The spectral detection device may also comprise multiple light sensors and/or multiple filtering structures to measure different spectral components in parallel. Moreover, the invention is not restricted to light in the visible range, but is also applicable to the UV or IR spectral wavelengths ranges.

Furthermore, in the claims, the word "comprising" does not exclude other elements or steps, and the indefinite article "a" or "an" does not exclude a plurality.

The invention claimed is:

1. A spectral detection device for detecting spectral components of
received light, wherein said spectral detection device comprises:
a variable filtering structure arranged to filter the received light and to output light with a wavelength within a predetermined wavelength range, the variable filtering structure enabling a variation of said predetermined wavelength range over time, wherein the variable filtering structure includes a first switchable photonic band gap filter having a first reflecting band of frequencies and a second switchable photonic band gap filter having a second reflecting band of frequencies different from the first reflecting band of frequencies, such that the predetermined wavelength range lies between the first and the second reflecting bands of frequencies;

a light sensor arranged to detect the light output by the variable filtering structure; and an angle selection element arranged to restrict an angle of incidence for the light received by the variable filtering structure to a predetermined angle of incidence, wherein said predetermined wavelength range is adjusted by applying external stimulus to the variable filtering structure, wherein said external stimulus is selected from the group consisting of an electric field, temperature and a mechanical force.

2. A spectral detection device according to claim 1, wherein said predetermined wavelength range has a width between 20 nm and 200 nm.

3. A spectral detection device according to claim 1, wherein the angle selection element is variable to allow a variation of said angle of incidence.

4. A spectral detection device according to claim 1, wherein said angle selection element comprises a plurality of regions, wherein each region is adapted to accept light with a different angle of incidence.

5. A spectral detection device according to claim 1, further comprising a diffuser.

6. An illumination device comprising:
a plurality of light emitting devices of different colors;
a spectral detection device according to claim 1;
a control unit adapted to process a plurality of spectral components acquired from said spectral detection device, wherein said control unit is further adapted to control the plurality of light emitting devices based on the detected spectral components to achieve a predetermined lighting effect.

7. An illumination control system for controlling a plurality of luminaries, said system comprising:
a spectral detection device according to claim 1 for detecting spectral components of light received from said luminaries;
a control unit adapted to process the spectral components acquired from said spectral detection device, wherein said control unit is further adapted to control said luminaries based on the detected spectral components to achieve a predetermined lighting effect.

8. A spectral detection device according to claim 1, wherein said predetermined wavelength range has a width between 20 nm and 50 nm.

9. The spectral detection device of claim 1, wherein the first switchable photonic band gap filter is placed adjacent to the second switchable photonic band gap filter.

10. The spectral detection device of claim 1, wherein the variable filtering structure comprises a pixelated filtering structure.

11. The spectral detection device of claim 10, wherein the pixelated filtering structure comprises the first and the second switchable photonic band gap filters arranged in a first layer and a third and a fourth switchable photonic band gap filters are arranged in a second layer, wherein the first layer is disposed adjacent the second layer.

12. The spectral detection device of claim 11, wherein the pixelated filtering structure is segmented into at least four regions, wherein light falling onto a first region passes the first switchable photonic band gap filter and the third switchable photonic band gap filter, wherein light falling onto a second region passes the second switchable photonic band gap filter and the fourth switchable photonic band gap filter, wherein light falling onto a third region passes the first switchable photonic band gap filter and the fourth switchable photonic band gap filter; and wherein light falling onto the fourth region passes the second switchable photonic band gap filter and the third switchable photonic band gap filter.

13. The spectral detection device of claim 11, wherein the at least one light sensor comprises a light sensor corresponding to each of the pixels of the pixelated filtering structure.

14. An illumination device comprising:
a plurality of light emitting devices of different colors;
a spectral detection device for detecting spectral components of light received from the light emitting devices, comprising:
a variable filtering structure arranged to filter the received light and to output light with a wavelength within a predetermined wavelength range, the variable filtering structure enabling a variation of said predetermined wavelength range over time;
a light sensor arranged to detect the light output by the variable filtering structure; and
an angle selection element arranged to restrict an angle of incidence for the light received by the variable filtering structure to a predetermined angle of incidence; and
a control unit adapted to process a plurality of spectral components acquired from said spectral detection device, wherein said control unit is further adapted to control the plurality of light emitting devices based on the detected spectral components to achieve a predetermined lighting effect.

* * * * *